Feb. 1, 1955
A. ETIENNE
2,700,900
APPARATUS FOR DETERMINING THE LEVEL
OF A VOLATILE LIQUID IN A VAPORIZER
Filed Feb. 21, 1949
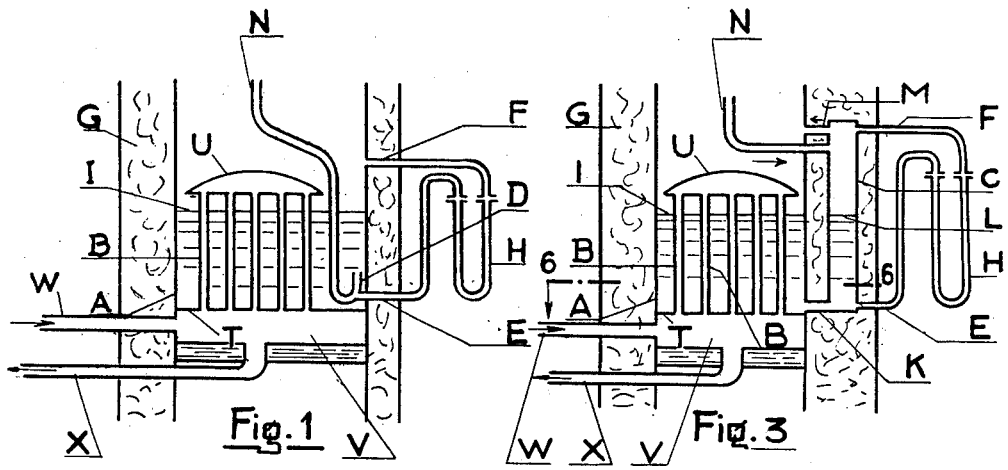
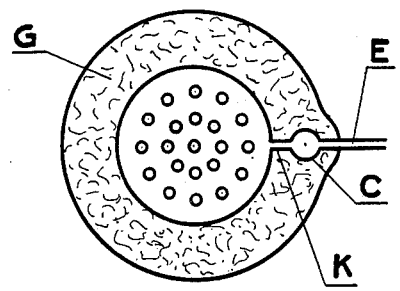
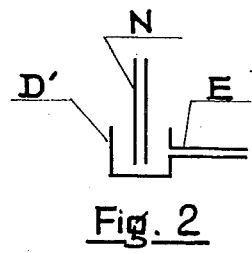
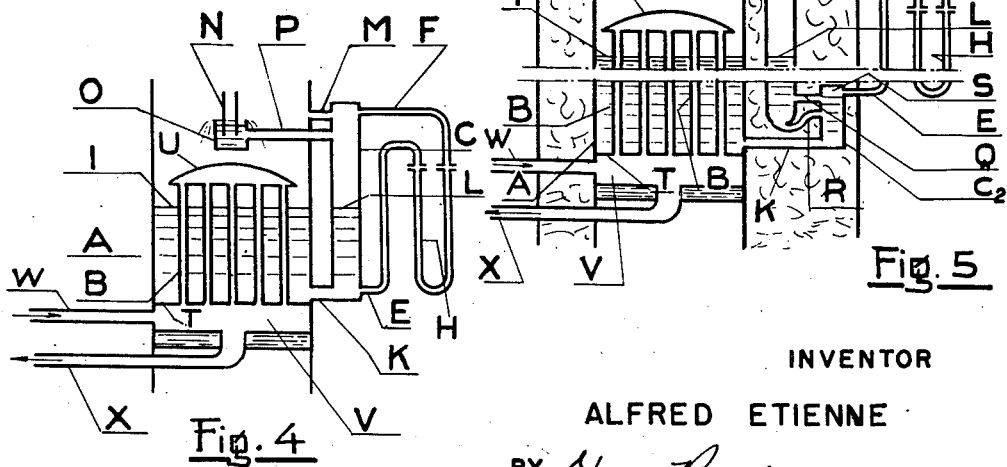
INVENTOR
ALFRED ETIENNE
BY Stone, Boyden & Mack.
ATTORNEYS

United States Patent Office 2,700,900
Patented Feb. 1, 1955

2,700,900

APPARATUS FOR DETERMINING THE LEVEL OF A VOLATILE LIQUID IN A VAPORIZER

Alfred Etienne, Paris, France, assignor to L'Air Liquide, Societe Anonyme pour l'Etude et l'Exploitation des Procedes Georges Claude Application February 21, 1949, Serial No. 77,668

Claims priority, application France March 16, 1948

3 Claims. (Cl. 73—302)

This invention relates to an apparatus for determining the level of a volatile liquid in a vaporizer fed by a volatile liquid containing an impurity that is less volatile than itself. By volatile liquid is meant here a liquid of which the temperature of vaporization, under the pressure at which the liquid of the vaporizer happens to be, is lower than the surrounding temperature. Such a liquid is, for instance, liquefied oxygen.

A standard method for determining the level of a volatile liquid in a receiver consists in measuring the pressure difference between the gas above the liquid and some gas coming from the vaporization of a portion of the liquid at a fixed spot located at the lowest level that may be determined, the second gas bubbling up to the liquid surface. The difference between the pressure of this gas and the pressure of the gas above the liquid bath is proportional to the height of this bath above the spot where the vaporization takes place. All that has to be done, therefore, is to measure this difference in pressure, for instance, by means of a differential liquid pressure-gauge to know the level of the volatile liquid in the receiver. The partial vaporization of the liquid takes place in a pipe leading to the pressure-gauge, and it is the gas thus vaporized that bubbles through the liquid bath. In practice, this vaporization occurs as a rule in an adequate manner under the effect of the heat absorption through the insulating material that surrounds the pipe.

The method that has been mentioned is especially applicable when the receiver is a vaporizer into which continually volatile liquid is fed and in which a corresponding amount of liquid is simultaneously vaporized. If, then, the volatile liquid contains an impurity that is less volatile than itself, it gradually becomes enriched in this impurity during the working of the vaporizer. The impurity may then collect in the pipe that leads to the pressure-gauge and thus falsify the readings of the latter. Certain impurities may also cause explosions therein. Such is especially the case of oxygen vaporizers for industrial equipment for separation of air, since, as is known, the oxygen contains always traces of hydrocarbons, especially acetylene, that may form in course of time dangerous deposits.

In United States Patent 2,548,168 to Jules Valeau there has been already disclosed a method and a device making it possible to avoid the inconveniences that have been mentioned. The device consists of a pipe connecting two points of the vaporizer located at two different levels both below the level of the liquid, and in which the liquid circulates upwards while being vaporized partially by the heat absorption, so that the comparatively not very volatile impurities do not collect in the pipe. The differential pressure-gauge records the difference between the pressure of the gas resulting from the partial vaporization of the liquid in the pipe and the pressure of the gas above the liquid in the vaporizer.

The object of the present invention is to provide another means for avoiding the inconveniences recalled above. It is illustrated by the annexed drawings in which:

Figure 1 shows a schematical sectional elevation of a first embodiment of the invention.

Figure 2 shows a modified form of a portion of Figure 1.

Figures 3 and 4 show schematical sectional elevation of two further embodiments of the invention.

Figure 5 shows a schematical sectional elevation of a preferred embodiment of the invention.

Figure 6 shows in plan view the same embodiment as shown by Fig. 3.

The same part of the device is, in all the figures, denoted by the same letter. In all the forms of execution illustrated it has been assumed that the liquid reaches the vaporizer by gravity, which is the general rule, but the principle of the invention would still apply if the liquid were brought into the vaporizer through any other means, for instance by means of a pump.

In the arrangement illustrated in Figure 1, A designates the outer casing of a vaporizer, the bottom of which is a horizontal plate T. In plate T are sealed some rising tubes B opening at their upper end in a closed dome U to which they are sealed. The volatile liquid fed to the vaporizer A is, for instance, oxygen at substantially atmospheric pressure, and the vaporizer A is heated by condensation in tubes B of a gas, as nitrogen under a pressure of about 5 absolute atmospheres arriving by a tube W in a chamber V, wherefrom it escapes in a liquid state by a tube X. The volatile liquid enters into the vaporizer A through a descending tube N continued at its lower portion by a rising tube D opened at its end. On the rising tube D is connected a pipe E that leaves the vaporizer A and enters into the insulating material G surrounding the vaporizer. The liquid coming from the pipe D that enters into the pipe E is vaporized in the insulating material G, and the vaporized gas bubbles through the volatile liquid of the vaporizer A. Another pipe F communicates with the gas above the volatile liquid. On the pipes E and F is connected a differential pressure-gauge H, that shows the height of the volatile liquid in the receiver A above the pipe E, that is to say the level I of the liquid.

Figure 2 illustrates an arrangement in which the rising pipe D is replaced by a cup D'.

Figure 3 illustrates a form of embodiment characterized by the following: the vaporizer communicates with an auxiliary container C through two channels one of which is located below and the other above the level of the liquid. The liquid feeding the vaporizer goes first of all into the auxiliary container C and from there into the vaporizer, its speed being kept sufficiently low so that the level of the liquid is substantially the same in the auxiliary container and in the vaporizer, and the liquid through which the gas coming from the vaporization of a portion of the liquid bubbles is that contained in the auxiliary container. When the foregoing conditions are simultaneously fulfilled, the differential pressure-gauge shows the substantially common level of the liquid in the auxiliary container and in the vaporizer.

The liquid flows from the feed pipe N to the auxiliary container C. In the lowest part of container C open on one hand a pipe E connecting the same to the pressure gauge H and on the other hand a pipe K connecting the container C to the vaporizer A. A pipe M establishes the communication of the two rooms above the liquid in the vaporizer and the container C. The level of the volatile liquid is substantially the same in the container C (reference character L) and in the vaporizer A (reference character I), as illustrated, and the gas formed in the pipe E bubbles through the liquid of the container C.

Figure 4 illustrates a form of embodiment in which a portion only of the volatile liquid going to the vaporizer flows through the place where the pressure that is compared to that of the gas above the liquid in the vaporizer prevails. This figure is distinct from Figure 3 solely by the fact that the insulating material G has not been shown, and that the liquid that comes through the pipe N flows through an overflow receiver O, from which a portion of the liquid falls directly into the vaporizer A while only the remaining portion goes through a pipe P into the container C. This form of embodiment avoids causing the passing through the pipe container C of an excessive amount of liquid. It is therefore especially suitable for large-sized equipment.

As the liquid that feeds the vaporizer has a much lower concentration of comparatively not very volatile impurities than the liquid undergoing vaporization in the vaporizer, the inconveniences indicated above are appreciably reduced when operating according to any of the forms of embodiment described above. However, the gathering of not very volatile impurities in the pipe E is not entirely cut out. In order to eliminate it altogether, steps may be taken in one of the following ways:

1. The single pipe E of any one of Figs. 1 to 4 is replaced by a two-branch pipe as disclosed by the above mentioned Patent No. 2,542,168.

2. In the customary case where the liquid that feeds the vaporizer is brought to it by gravity, the descending portion of the course followed by this liquid is divided into two superimposed sections communicating through a liquid seal, and the gas the pressure of which is compared to that of the gas above the liquid in the vaporizer is that coming from the partial vaporization of the liquid in the lower section. This avoids the vaporization of liquid in a tube going to the pressure-gauge, a vaporization that is accompanied by a gradual concentration, in the tube, of the comparatively not very volatile impurities.

Figure 5 illustrates this form of embodiment. Container C of Fig. 3 is replaced by two containers $C_1$ and $C_2$, which are offset in respect to one another, both containers communicating by two tubes Q and R, located at different levels. As shown by Figure 5, the liquid arriving into container $C_1$ by pipe N flows by the tube R to the container $C_2$, wherefrom it is discharged to the vaporizer A by the tube R. In $C_2$, a partial vaporization of the liquid occurs, due to the small thickness of insulating material between $C_2$ and the surrounding atmosphere. The resulting gas gathers at the top of $C_2$ in the space S wherefrom, through the tube Q,, it passes to container $C_1$ wherein it bubbles up to the surfaec of the liquid in the same. In S opens the tube E communicating with the pressure gauge H.

What I claim is:

1. An apparatus for determining the level of the liquid in a vaporizer fed by a volatile liquid containing an impurity less volatile than itself, comprising a first pipe delivering the liquid to the vaporizer at a point below the liquid level therein, a differential liquid pressure gauge connected to said vaporizer at a point above the liquid therein, a second pipe connected to said first pipe at a point under the liquid level in said vaporizer and to said pressure gauge for feeding a relatively small portion of the feeding liquid toward said pressure gauge, this portion being partly vaporized in the said second pipe by an intended heat exchange with the surrounding air, said second pipe discharging beneath the level in the vaporizer, said differential liquid pressure gauge serving to compare the pressure of these resultant vapors with the pressure of the gas above the liquid in the vaporizer.

2. An apparatus for determining the level of the liquid in a vaporizer fed by a volatile liquid containing an impurity less volatile than itself, comprising an auxiliary container communicating with the vaporizer through two conduits, one of which is located below and the other above the liquid level in the vaporizer, in which container is introduced through the second named conduit at least a portion of the liquid feeding the vaporizer, a differential liquid pressure gauge distinct from the said auxiliary container and connected to the same by two pipes opening in the said container, the first one above the liquid level therein, and the second one under this liquid level, in which second pipe a small part of the liquid of the container is vaporized by an intended heat exchange with the surrounding air, the resultant vapors bubbling through the liquid in said auxiliary container, said differential liquid pressure gauge serving to compare the pressure of these resultant vapors with the pressure of the gas above the liquid in the vaporizer.

3. An apparatus for determining the level of the liquid in a vaporizer fed by a volatile liquid containing an impurity less volatile than itself, comprising an auxiliary container communicating with the vaporizer through two conduits, one of which is located below and the other above the liquid level in the vaporizer, means for introducing into said container at least a part of the liquid feeding the vaporizer, said container being divided into two vertical offset sections communicating through a liquid seal, a differential liquid pressure gauge connected on one hand to the uppermost of said sections by a first pipe opening in this section above the liquid level therein and on the other hand to the lowermost of said sections by a second pipe opening in this section below the liquid level therein, the liquid running in the second pipe being vaporized therein by an intended heat exchange with the surrounding air, said differential liquid pressure gauge serving to compare the pressure of these resultant vapors with the pressure of the gas above the liquid in the vaporizer.

References Cited in the file of this patent

UNITED STATES PATENTS

| | | |
|---|---|---|
| 1,886,179 | Goodloe | Nov. 1, 1932 |
| 1,902,276 | Bull | Mar. 21, 1933 |
| 1,904,785 | Gay | Apr. 18, 1933 |
| 2,632,681 | Zenner | Mar. 3, 1936 |
| 2,069,917 | Fischer | Feb. 9, 1937 |
| 2,326,511 | Zenner | Aug. 10, 1943 |